UNITED STATES PATENT OFFICE.

CLINTON E. DOLBEAR, OF SAN FRANCISCO, CALIFORNIA, ASSIGNOR, BY DIRECT AND MESNE ASSIGNMENTS, OF THREE-FOURTHS TO DAVID C. NORCROSS AND ONE-FOURTH TO JOHN H. MILLER AND GEORGE J. HENRY, ALL OF SAN FRANCISCO, CALIFORNIA.

PROCESS FOR RECOVERING POTASSIUM SALTS FROM SOLUTIONS CARRYING BORATES OR CARBONATES OR BOTH.

1,373,179.      Specification of Letters Patent.      Patented Mar. 29, 1921.

No Drawing.      Application filed October 30, 1919. Serial No. 334,487.

*To all whom it may concern:*

Be it known that I, CLINTON E. DOLBEAR, a citizen of the United States, and a resident of the city and county of San Francisco, State of California, have invented new and useful Improvements in Processes for Recovering Potassium Salts from Solutions Carrying Borates or Carbonates or both.

My invention is especially applicable to the recovery of salts of potassium, such as the chlorid, nitrate, chlorate, citrate, etc., when carried in solutions, where such solutions also have in suspension other salts, which must be separated out in advance, such as the carbonates or borates of potassium and sodium, and in some cases arsenic tri-sulfid. An example of such solution is the water of Searles Lake, located in Inyo county, California, which carries sodium chlorid, sodium carbonate, sodium sulfate, sodium borate, potassium chlorid and arsenic tri-sulfid, the latter probably combined with sodium compounds.

In my co-pending application, Serial No. 281,650, filed March 10, 1919, I have set forth a process for the recovery of potassium salts from such solutions, involving the employment of calcium sulfate, wherein the reactions therewith are given, and to which attention is directed.

In the process herein disclosed, I first treat the initial solution containing the carbonates with calcium sulfate, which reacts to form insoluble calcium carbonate. The resulting solution still retains any borates, and the arsenic tri-sulfid, which may be present, and is now to be treated with an aluminum compound, and I prefer the aluminum sulfate for this. The reaction that now takes place results in the formation of insoluble aluminum borate and arsenic tri-sulfid. This latter is soluble in an alkaline solution, and is insoluble in a neutral, or acid solution. The reaction with the aluminum sulfate changes the alkaline solution to one having neutral or acid reaction, and therefore the arsenic tri-sulfid is precipitated with aluminum borate and the potassium salt may be readily separated from the solution in any well known way, as by fractional crystallization.

In order to make the process economical and cyclic, the precipitate of aluminum borate and arsenic tri-sulfid is now to be treated preferably with sulfuric acid and water. The reaction will form aluminum sulfate and boric acid and leave insoluble arsenic tri-sulfid. If the solution be heated the aluminum salt and boric acid will dissolve and the arsenic tri-sulfid be separated.

The boric acid is readily crystallized from the solution on cooling, and the aluminum sulfate returned for treatment of additional initial solution containing borates, thus making its use, and the process, cyclic.

The chemical reaction that takes place in the several steps as applicable to the waters of Searles Lake are indicated herewith, wherein the recovery primarily of potassium chlorid is sought by the use of aluminum sulfate as a reagent, and the recovery and re-use of the aluminum sulfate, and also the recovery of boric acid, resulting from the original sodium borate contained in solution.

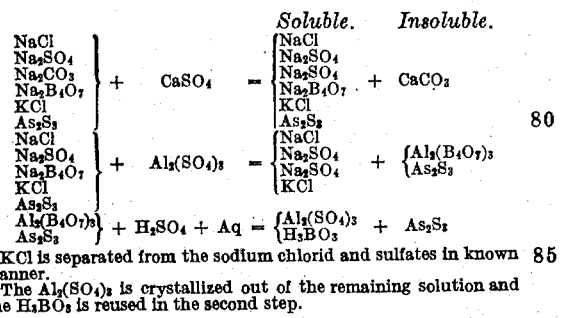

KCl is separated from the sodium chlorid and sulfates in known manner.
The $Al_2(SO_4)_3$ is crystallized out of the remaining solution and the $H_3BO_3$ is reused in the second step.

It will be observed in the treatments of solutions containing no carbonates, the first step recited above may be omitted. The employment of the aluminum compound, as the sulfate, in the present example is for the purpose of removing the borate from the original solution and thus permitting separation of the potassium chlorid, free from borax. It will also be clear that other analagous salts, as the nitrate, citrate, chlorate, etc., if present in the original solution, instead of the chlorid, may be recovered in the same manner as the chlorid.

It will also be observed that in place of sulfuric acid, to recover the aluminum as a sulfate, other acids may be employed, and that other salts than the sulfate of aluminum may be employed and recovered; thus aluminum chlorid may be substituted for the aluminum sulfate and hydro-chloric acid may be used in place of sulfuric acid and the recovery of the aluminum chlorid so effected and used thereafter in the cycle of treatment.

I claim:

1. The process of recovering salts from solutions carrying borates and carbonates, consisting of treating the said solution with calcium sulfate and thereafter separating the insoluble calcium carbonate, and then treating the resulting solution with aluminum sulfate and separating out the insoluble aluminum borate, and thereafter separating the potassium salts from the remaining solution.

2. The process of recovering potassium salts from solutions carrying borates and carbonates, and arsenic tri-sulfid, consisting of treating the said solutions with calcium sulfate and thereafter separating the insoluble calcium carbonate, and then treating the resulting solution with aluminum sulfate and separating out the insoluble aluminum borate, and thereafter separating the potassium salts from the remaining solution.

3. The process of recovering a potassium salt from solutions carrying also compounds of boron by adding thereto aluminum sulfate, and then separating the desired potassium salt from the resulting solution.

4. The process of recovering a potassium salt from a solution containing also sodium borate and arsenic tri-sulfid by adding aluminum sulfate and recovering the potassium salt from the resulting solution.

5. The recovery of potassium salt from solutions carrying a borate and arsenic tri-sulfid by the addition of an aluminum compound that re-acts to form insoluble aluminum borate and insoluble arsenic tri-sulfid in a non-alkaline solution, separating the precipitate from the solution and crystallizing out from the solution the potassium salt.

6. The recovery of potassium salt from solutions carrying borate and arsenic tri-sulfid by the addition of an aluminum compound that re-acts thereon to form insoluble aluminum borate and insoluble arsenic tri-sulfid in a non-alkaline solution, separating the precipitate from the solution and crystallizing out from the solution the potassium salt, and then treating the precipitate from the last mentioned reaction with water, heat and an acid to reform the first mentioned aluminum compound in solution with boric acid, and then separating the insoluble arsenic tri-sulfid, and then crystallizing out the boric acid and utilizing the remaining solution containing the aluminum compound for treatment of additional batches of initial solution.

7. The process of recovering a potassium salt from solutions carrying also compounds of boron by adding thereto an aluminum compound to form insoluble aluminum borate and then separating the potassium salt from the remaining solution.

8. The process of recovering potassium salt from solutions carrying borates and carbonates, consisting of treating the said solution with calcium sulfate and thereafter separating the insoluble calcium carbonate, and then treating the resulting solution with an aluminum compound and separating out the insoluble aluminum borate, and thereafter separating the potassium salt from the remaining solution.

In testimony whereof I have hereunto set my hand at the city of San Francisco, California, this 25th day of October, 1919.

CLINTON E. DOLBEAR.